Feb. 20, 1968  H. H. KROEGER ET AL  3,369,938

CATALYTIC ELECTRODES AND FUEL CELLS THEREWITH

Filed Jan. 3, 1966  2 Sheets-Sheet 1

INVENTORS.
HANNS H. KROEGER
KLAUS DEHMELT
BY
ATTORNEY.

3,369,938
CATALYTIC ELECTRODES AND FUEL CELLS THEREWITH

Hanns H. Kroeger, Gainesville, Fla., and Klaus Dehmelt, Steinbach, Taunus, Germany, assignors to Varta Aktiengesellschaft, Frankfurt am Main, Germany, a corporation of Germany
Continuation-in-part of application Ser. No. 149,309, Nov. 1, 1961. This application Jan. 3, 1966, Ser. No. 518,475
4 Claims. (Cl. 136—86)

The present application is a continuation-in-part of pending patent application Ser. No. 149,309, Method of Producing Catalyst Electrodes, filed Nov. 1, 1961, now Patent No. 3,248,214.

The present invention relates to a new and improved catalytic electrode, such as used, for instance, in galvanic elements and, more particularly, in fuel cells.

All known production methods for such catalytic electrodes have the common disadvantage that they require a considerable number of steps, some of which must be separated by varying intervals of time. In one known method, for instance, a porous body is sintered from a metallic powder and, after the sintered body has been cooled, it is impregnated with a solution of a salt of a catalytically active metal. After impregnation, the catalytically active metal or its oxide is chemically or electrochemically precipitated. Finally, undesirable impurities and ions must be washed out of the catalytically activated body.

In another known method, a Raney nickel alloy, for instance, is sintered together with the material for the matrix of the electrode but the subsequent activation of the potentially catalytically active material requires a considerable number of steps, i.e. repeated treatment of the sintered body with concentrated alkali metal hydroxide solution to dissolve and remove the catalytically inactive metal, for instance, aluminum.

It is a primary object of this invention to utilize as the catalytically active component of a porous electrode body materials which are catalytically active under the operating conditions of low temperature fuel cells but cannot be sintered to obtain a porous mechanically stable body with sufficient electrical conductivity.

It is another object of the present invention to provide a particularly economical method of producing catalytic electrodes, which method requires a minimum of production steps.

The above and other objects and advantages are attained in accordance with the invention by placing a metallic powder which is catalytically inactive under the operating conditions of the electrode but capable of being sintered into a mold and pre-molding it into a porous cup-shaped body having an open recess. The recess is then filled with any desired catalytically active substance, which may be in particulate form, for instance, in powder form or which may have been pre-shaped into a porous body conforming to the recess. After the recess has been filled with the catalytic substance, the recessed cup-shaped body is covered with a layer of a metallic powder capable of being sintered and also being catalytically inactive under the operating conditions of the electrode. The metallic powders of the cup-shaped body, the non-sinterable catalytically active material, and the covering layer are pressed together in the mold and the metallic powders are sintered together, preferably in the mold, to form the catalytic electrode.

If the catalytically active substance is poured into the pre-molded cup-shaped body in particulate powder form, care should be taken to prevent its particles from covering the rim of the cup-shaped body so that the covering layer may contact this rim directly and proper sintering together of cover and body may be assured in all instances.

It may be preferred, under certain circumstances, to compact the catalytically active substance into a shaped body and to insert this body into the recess. In this case it may be advantageous to use a compact catalyst body having several layers which have a different mean pore size. For example when the electrode body is used as a gas diffusion electrode this form may be better adapted to operating conditions with varying gas pressure, as will be further explained in connection with FIG. 7.

The porosity of the walls and/or the catalytically active core may be increased by adding to the metallic powder and/or the catalytically active substance a material which decomposes at the temperatures used in sintering the layer enveloping the non-sinterable catalytically active core, such as ammonium carbonate, ammonium chloride, hydrazine derivatives, sodium azide ($NaN_3$) and urea or other compounds which decompose at the temperature of sintering without leaving any residues.

The mechanical and electrical contact between the catalytically active and non-sinterable substance and the sintered electrode body will be improved if an electrically conductive substance in particulate form is added to said catalytically active non-sinterable substance. Relatively low pressure may be used if sintering is effected in the same mold wherein the sintered body is compressed and while the metallic powders are pressed together. In this instance the above materials used to increase the porosity in the normal sintering process cannot be used and must be replaced by substances which may be removed by treating the electrode body with solvents. Substances of this kind are potassium chloride, potassium chromate, aluminum sulfate, and others.

The above and other features of the present invention will be more readily understood by reference to the following detailed description of certain preferred embodiments thereof, taken in conjunction with the accompanying drawing wherein FIG. 1 is a vertical section through a mold showing the first production steps;

Figure 1:
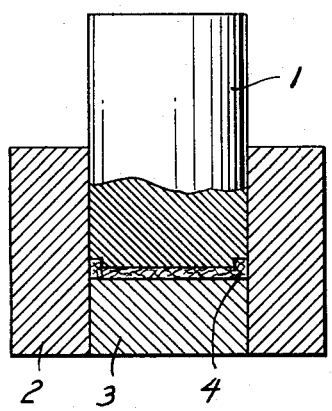

Referring now to the drawing, wherein like reference numerals refer to like parts in all figures, mold parts 2, 3 are shown in FIG. 1 to form the female portion with which the pressure-actuated male mold part 1 cooperates in pre-molding the cup-shaped body 4 of metallic powder. As shown, this cup-shaped body is formed with a central recess surrounded by an annular rim corresponding to a like annular recess in mold part 1.

Figure 2:
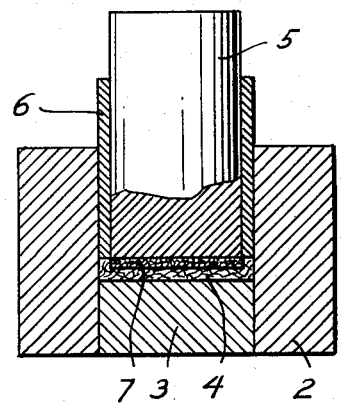
FIGS. 2 to 4 are similar views showing subsequent production steps.

FIG. 2 illustrates one preferred method wherein the catalytically active substance is poured into the recess of the pre-molded cup-shaped body in particulate form. This may readily be accomplished by placing upon the rim of the cup-shaped body a tube 6 whose wall thickness is exactly the same as the diameter of the rim. In this manner, the rim will be masked when particulate catalytically active material 7 is poured into the recess through tube 6, thus keeping the material off the rim and making certain that it will not interfere during the subsequent sintering procedure to be explained more fully in connection with FIG. 4.

After the recess of cup-shaped body 4 has been filled with the particulate catalytic substance 7, a pressure-actuated mold part 5, which fits exactly into tube 6, compacts the catalytically active substance sufficiently so that its surface is at least flush with the rim of the cup-shaped body.

Figure 3:
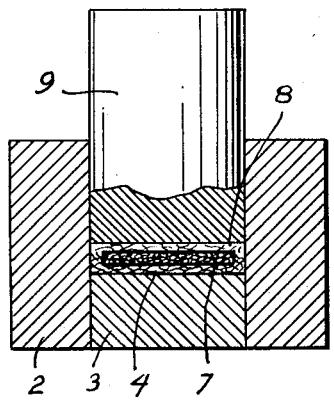

FIG. 3 illustrates how a covering layer 8 of a sinterable metallic powder, producing a larger pore diameter than the powder used for the cup-shaped body 4, is placed over the cup-shaped body and its recess filled with catalyst 7, pressure-actuated male mold part 9 being used to press the metallic powders of layer 8 and cup-shaped body 4 together and to unite them into an integral electrode body.

Figure 4:
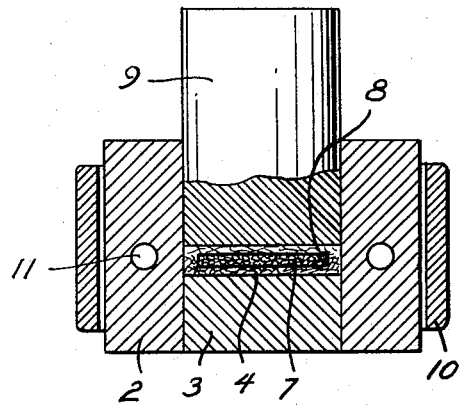

FIG. 4 schematically illustrates how the final step of compression and molding of the electrode body may be effected in the presence of heat to sinter the metallic powder. As shown, the female mold part 2 is surrounded by heating means 10, for instance, an electrical heating device, to raise the temperature sufficiently to effect sintering while the metal powder is compressed. Channels 11 are provided in mold part 2 so that cooling fluid, such as water, may be used to cool the mold rapidly after sintering has been completed.

Figure 5:
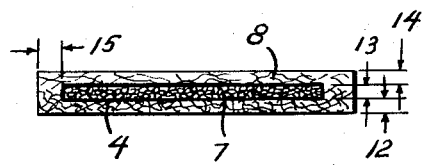
FIG. 5 is a cross section of a finished catalytic electrode produced according to the invention.

A finished electrode body according to the present invention is shown in FIG. 5. Such catalytic electrodes are particularly useful in smaller apparatus and optimum dimensions are obtained if the diameter of the electrode does not exceed about 18 cm., and is preferably about 10 cm. If the electrode diameter is larger, its mechanical stability should be increased, for instance, by providing a perforated metal sheet or like insert, or by supporting the electrode body. It has been found that the optimum range of the thickness 13 of the catalytically active substance lies between about $50\mu$ and about $1000\mu$. If the electrode diameter is about 7 cm. to 8 cm., the optimum thickness of the electrode end walls, shown at 12 and 14, is about $500\mu$, thickness 13 then being about $350\mu$. Obviously, the thickness of the catalytically active layer depends primarily on the degree of activity of the substance forming that layer. The thickness of the electrode end walls will depend primarily on the purely mechanical requirements of the finished electrode and on the degree of porosity of the walls. Obviously, the catalyst in the recess can become effective only if it is accessible to the electrolyte and to the reaction gas through the walls of the electrode body and the permissible thickness of the electrode body walls increases with their porosity.

The thickness 15 of the side wall of the electrode body will be about the sum of the thicknesses 12 and 14. It is advantageous to make the side wall so thick that the catalytically active substance 7 is not, or hardly, accessible therethrough. If the electrode body is to be mounted in a tubular reaction vessel, the thickness 15 may be chosen large enough to enable the electrode body to be mounted around its edge in the tube, thus removing part of the annular end zone of the electrode body from the reaction vessel.

Figure 6:
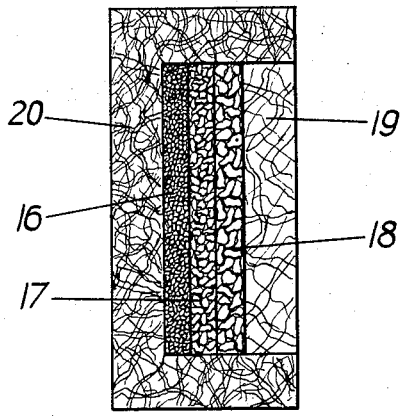
FIG. 6 is a side elevation of a gas diffusion electrode.

FIG. 6 shows a preferred embodiment of a gas diffusion electrode according to the invention. The drawing is not to scale and especially the porous structure of the different parts of the electrode is only shown schematically, since it cannot be accurately represented in a two dimensional picture. Here 20 is the cup-shaped part of the electrode, which carries in its recess the catalyst body comprising the layers 16, 17, and 18. The body 20 is formed by one end wall and the side walls have a smaller average pore diameter than the remaining end wall 19 and any of the porous layers 16 to 18 inclusive, which form the catalyst body. The porosity of these layers is adjusted by means of the grain size of the powder and by the pressure used in forming the separate layers in such a way, that the average pore diameter has the smallest value for the layer 16 while layer 17 has a larger average pore diameter and the pore size of layer 18 is larger than in layer 17 and smaller than in the end wall 19. The advantages of the different sizes of the pores of layers 16, 17, and 18 will become apparent in the description of FIG. 7 showing the electrode in use with a fuel cell.

Figure 7:
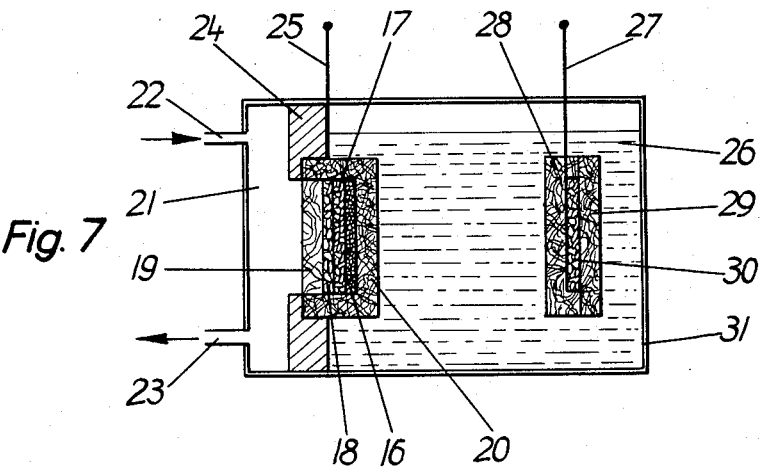
FIG. 7 shows the electrodes of FIG. 6 and FIG. 8 in use with a fuel cell shown as a side elevation.
Figure 8:
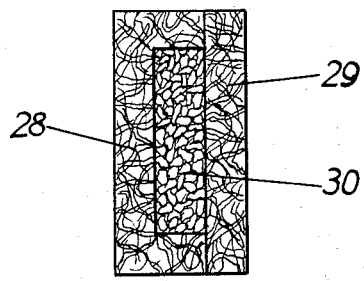
FIG. 8 is a side elevation of an electrode body suitable for use as a dissolved fuel or antifuel electrode.

FIG. 7 shows the gas diffusion electrode of FIG. 6 and a liquid fuel electrode as shown in FIG. 8 in use with a fuel cell. The gas diffusion electrode consisting of the parts 20, 16, 17, 18, and 19 together with the holder 24 forms a wall separating the gas space 25 of the fuel cell container 31 from the electrolyte space 26. Oxygen gas or air is fed into the gas space 21 through pipe 22 and unused oxygen and inert gases are taken out through outlet line 23. The part 20 consists of sintered carbonyl nickel powder and has an average pore diameter of 1.5 microns causing an approximate capillary pressure of the electrolyte fuel mixture of 1 kg./sq. cm. The end wall 19 is inserted into the cup-shaped body 20 and also consists of sintered carbonyl nickel with an average pore diameter of 20 microns which corresponds to a low capillary pressure of approximately 0.07 kg./sq. cm. This layer 19, which is adjacent to the gas space 21 will therefore act as a gas distribution layer for the three layers 16, 17, and 18 which form the catalyst body. These layers consist of carbon powder impregnated in a silver nitrate solution. Layer 16 has an average pore diameter of 2 microns causing a capillary pressure of 0.7 kg./sq. cm., layer 17 has a pore diameter of 2.8 microns corresponding to a capillary pressure of 0.5 kg./sq. cm. and layer 18 has the average pore diameter of 7 microns and therefore the capillary pressure of 0.2 kg./sq. cm. The three phase boundary in which the electrochemical reaction takes place between gas and electrolyte in the presence of the catalyst will form at the part of the electrode, where the capillary pressure of the electrolyte is equal to the gas pressure. In this way the above choice of several pore diameters ensures that the three phase boundary stays within one of the three layers 16, 17, and 18 forming the catalyst body when the gas pressure is in the range between 0.2 and 0.7 kg./sq. cm. The holder 24 consists of stainless steel and also serves as an electrical contact between the current conductor 25 and the electrode. The electrolyte space 26 is filled with 6 N aqueous potassium hydroxide solution to which an amount of methanol resulting in a 4 molar methanol concentration has been added as fuel.

The electrochemical conversion of the fuel takes place at the catalyst body 30 of the electrode which is shown more detailed in FIG. 8 and also contains the cup-shaped body 28 and the end wall 29. The parts 28 and 29 both consist of sintered carbonyl nickel and have an average pore diameter of 20 microns to facilitate the flow of the fuel-electrolyte mixture to the porous catalyst body 30, which consists of a mixture of 95% by weight nickel powder and 5% platinum sponge. Part 27 is the current conductor to the fuel electrode. A fuel cell as shown in FIG. 7 delivered a current of 25 milliamperes per sq. cm. at a voltage of 0.78 v. The alkaline electrolyte may have an alkalinity in the range equivalent to that of an aqueous sodium hydroxide solution of a normality of 1 to 12.

In fuel cell operations, an electrode through which a source of oxygen is introduced to the cell is commonly known as an "oxygen electrode." An electrode through which a combustible fuel is introduced to the cell or which accepts electrons from fuel admitted directly to the electrolyte is commonly known as "fuel electrode." When employed herein, the term "cathode" shall be understood to refer to the "oxygen electrode," and the term "anode" shall be understood to refer to the "fuel electrode."

The average pore diameter of the catalyst layer, and the average pore diameter of the several layers of the catalyst is suitably selected taking into consideration the gas pressure and the capillary pressure of the electrolyte. In a catalyst which has, for instance, 3 layers, as described above, suitable pore diameters for the various layers can be selected within the following ranges: 5, or preferably 7 to over 20, as for example to 100 microns for the catalyst layer adjacent the wall of the cup adjoining the gas space, 2.5 to 10 microns for the layer adjacent that layer, and 0.1 to 2 microns for the layer adjacent that layer.

In the electrode of the invention, the multilayered catalyst provides good tolerance for varying gas pressures, the three phase boundary then wandering between the extreme faces, or layers of catalyst. The catalyst can be made of more than 3 layers, if desirable.

In the construction of the electrode the pressure for pre-molding the cup-shaped body 4 may vary widely, for instance, between about 10 kg./sq. cm. and about 100 kg./cm., the amount of pressure depending only on that necessary for shaping the body and being preferably low enough to maintain a certain roughness of the surface of the rim of the body to which the covering layer is to be sintered subsequently. This pre-molding as well as the final molding pressure will vary with the ductility of the metallic powder used for making the electrode body and will accordingly increase, in the indicated order, from silver to carbonyl nickel A, carbonyl nickel B, cobalt, iron, silver-nickel alloys, cobalt-iron alloys, stainless steel and still harder metals.

Carbonyl nickel is a pulverulent metallic nickel obtained by the decomposition of the gaseous compound $Ni(CO)_4$, the nickel particles having a diameter of about 5 microns. The particles of carbonyl nickel A are primarily spherical while the B form is dendritic.

The final molding pressures, under which the cup-shaped body and the covering layer are united to form the electrode, may vary between about 680 kg./sq. cm. and about 1450 kg./sq. cm., depending on the ductility of the metallic powder. For instance, this pressure will increase from about 680 kg./sq. cm. for silver to 825–850 kg./sq. cm., for carbonyl nickel A, 1040–1090 kg./sq. cm. for carbonyl nickel B, 1180–1300 kg./sq. cm. for cobalt, about 1320 kg./sq. cm. for iron, and about 1400–1450 kg./sq. cm. for silver-nickel and cobalt-iron alloys as well as stainless steel.

The above substances illustrate metallic powders which are capable of being sintered and which make useful electrode bodies.

It will be understood that, among the substances, including those listed above, which are suitable for the outer cup-shaped portion and cover of the electrode there may be some which could, after suitable activating treatment, become catalytically active. However, for the purposes of this invention, such treatment is deliberately refrained from, any substance used to form the said cup-shaped portion and cover being either entirely incapable of catalytic activity, or else used in its catalytically inactive state.

A wide variety of catalytically active substances may be used in the practice of this invention, depending entirely on the catalytic effect desired in the finished electrode and it is a particular advantage of the invention that the catalytically active substance may be selected regardless of the ability of the substance to form a mechanically stable body. Since the catalytically active substance is held in the recess of the cup-shaped electrode body and then covered completely so that a mechanically resistant sintered wall surrounds the substance completely in the finished electrode, the mechanical stability of the catalytically active substance, or its lack thereof, makes no difference.

By way of example, but by no means limited thereto, the following catalysts may be useful as the catalytically active substance in the practice of this invention:

A mixture of the hydroxides of trivalent cerium, $Ce(OH)_3$, and divalent nickel, $Ni(OH)_2$; silver permanganate, $AgMnO_4$; manganese dioxide which has been electrolytically produced at room temperature; manganite, $MnO(OH)$; silver, in the form of sponge, platinum, and palladium; carbon powder impregnated with an aqueous solution of impregnated silver nitrate; cobalt-chromium and cobalt-aluminum spinel in the form of powder; Raney metals; green nickel oxide, NiO; a mixture of nickel and beryllium hydroxides; and cerous hydroxide, $Ce(OH)_3$; and others.

The electrodes of the invention are useful as oxygen electrodes or fuel electrodes. They are especially suited for fuel cells for operations at moderate temperatures such as in the range of minus 20° C. to about +120° C., especially from +10° C. to +80° C.

If the electrode is to be used as a hydrogen electrode in a fuel cell, it may be advantageous to subject oxides or hydroxides, if such are used as the catalysts inside the catalytically inert cup and cover, to preliminary reduction. This may readily be accomplished by heat treatment of the oxides or hydroxides at elevated temperature in a hydrogen atmosphere. If nickel salts or a salt mixture including nickel salts are used, it is preferred to effect this reduction in a nitrogen atmosphere.

Generally speaking, it is possible to add the catalytically inert metallic powder used for the electrode body to the catalytically active substance filling the recess to improve its electrical contact.

The following examples for producing an electrode with a

| | Mm. |
|---|---|
| Diameter of the electrode body | 74.0 |
| Thickness of the electrode side walls | 2.4 |
| Thickness of the electrode end walls | 1.3 |
| Thickness of the catalytic substance | 0.6 | will illustrate the practice of the present invention without in any way limiting the same thereto.

*Example 1*

Carbonyl nickel A powder is placed into the mold 2, 3 and compacted by male mold part 1 under a pressure of 10 kg./sq. cm. to form a cup-shaped porous body. After mold part 1 is removed, a stoichiometric pulverulent mixture of cobalt oxide and chromium oxide is poured into the recess of the cup-shaped body, as shown in FIG. 2, the tube 6 is removed, and a layer of carbonyl nickel A powder, having a different grain size if a different pore diameter is desired, is placed over the cup-shaped body, whereupon the covering layer is pressed against the cup-shaped body by mold part 9 for one minute under a pressure of 800–1000 kg./sq. cm. This pressure suffices to make it possible to remove the compacted body from the mold without damage and to place it into a sintering furnace where it is sintered in a hydrogen protective atmosphere at a temperature of 950° C. for three minutes. The electrode is useful for the diffusion and separation of oxygen.

*Example 2*

The procedure of Example 1 is repeated but silver powder is used instead of carbonyl nickel A and the catalytically active substance is a mixture of cerous oxide $Ce(OH)_3$ and nickelous oxide $Ni(OH)_2$. The final molding pressure is 680 kg./sq. cm. for 2 minutes and sintering is effected in a protective nitrogen atmosphere for 3 minutes at a temperature of 620° C. The electrode is useful as an oxygen electrode and for hydrogen peroxide.

*Example 3*

The procedure of Example 1 is repeated but carbonyl nickel B is used, the final molding pressure being increased to 1050 kg./sq. cm. The catalytically active substance is silver permanganate. All other conditions remain unchanged. The electrode is useful as an oxygen electrode.

*Example 4*

Example 1 is repeated, substituting cobalt powder for the external electrode body and manganite for the catalytically active substance. All conditions remain unchanged, except that the final molding is effected at a pressure of 1250 kg./sq. cm. for one minute and sintering in the mold is effected at a temperature of 850° C. for 5 minutes. The electrode is useful for the dissolution and separation of oxygen.

*Example 5*

Example 1 is repeated, with iron powder for the electrode body and electrolytically produced manganese dioxide as the interior catalyst. The final molding pressure is increased to 1320 kg./sq. cm. for 2 minutes and sintering takes place at a temperature of 950° C. for one minute. The electrode is useful as an oxygen electrode.

*Example 6*

Example 1 is repeated, with a silver-nickel alloy containing 30% of silver and 70% of nickel for the electrode body and a dried decomposition product of moistened silver permanganate as the interior catalyst. The final molding takes place at a pressure of 1400 kg./sq. cm. for 2 minutes and sintering at a temperature of 800° C. for 3 minutes. The electrode is useful as an oxygen electrode.

*Example 7*

Example 1 is repeated, with a cobalt-iron alloy containing 60% of cobalt and 40% of iron for the electrode body and uranium powder as the interior catalyst. Final molding is effected at a pressure of 1450 kg./sq. cm. for one minute and sintering takes place in a protective argon atmosphere at a temperature of 1,000° C. for 2 minutes. The electrode is useful as a hydrogen electrode.

*Example 8*

Example 1 is repeated but stainless steel is used for the electrode body and a mixture of cobalt-chromium spinel powder and cobalt powder in the proportion of 1:4 is used for the interior catalyst. The final molding pressure is 1450 kg./sq. cm. for one minute and sintering in the mold by electrical heating takes place at a temperature of 1030° C. for 2 minutes. The electrode is useful as an oxygen electrode.

*Example 9*

Example 3 is repeated but the interior catalyst is a tablet of activated carbon impregnated with an aqueous solution of silver nitrate to increase its catalytic activity. The final molding pressure is increased to 1500 kg./sq. cm. The compacted electrode body is sintered for 10 minutes at 650° C. in an ammonia atmosphere. The resultant electrode body has a porosity of 60% but is nevertheless so strong that it cannot be broken manually. The electrode is useful as an oxygen electrode.

*Example 10*

Example 1 is repeated but the active catalyst is a tablet consisting by weight, of 95% of carbonyl nickel A and 5% of platinum sponge. Sintering of the molded electrode body is effected in a nitrogen atmosphere at 800° C. for 5 minutes. The electrode is useful as a hydrogen electrode.

*Example 11*

Example 10 is repeated but 20%, by weight, of ammonium carbonate is admixed to the carbonyl nickel powder forming the catalytically inert covering layer. This causes the sintered top wall of the electrode body to have a porosity of 80% while the side walls and the bottom wall have a porosity of only 62%. The electrode is useful as a hydrogen electrode.

*Example 12*

Example 1 is repeated but the active catalyst is a tablet consisting of an intimate mixture, by weight, of 60% of silver permanganate, 20% of $MnO_2$ and 20% of cerous hydroxide. The thickness of the tablet is only two-thirds of the depth of the recess of the cup-shaped body of the electrode. The molded electrode body is sintered in an ammonia atmosphere at 600° C. for 10 minutes. When this electrode is fractured to expose its interior catalytic layer, it is shown that the recess is filled out completely by a loose mixture of silver, manganese dioxide, and cerous oxide.

It is obvious from the above examples that the catalytically inactive metallic powders for the electrode body and the catalytically active substances may be varied and combined in numerous ways, depending on the desired usage of the electrode and catalytic activity, the only requirement being that the metallic powder is capable of being sintered so as to form a mechanically stable electrode body. It is the particular advantage of the invention that there are no thermic or mechanical requirements for the catalytically active substance so that it is possible to use such substances which cannot be sintered to form a sintered body with the electrode forming metallic powders and/or which cannot readily be dissolved so that it is not possible to impregnate a porous electrode body with the catalytic solution to form a catalytically active electrode. When these advantages are considered with those afforded by a plurality of catalytic layers, it is evident that the invention provides an electrode of great versatility and effectiveness.

While various embodiments of the invention have been described and exemplified hereinabove, it will be clearly understood that many modifications and variations may occur to the skilled in the art without departing from the spirit and scope of this invention as defined in the appended claims.

We claim:
1. A mechanically stable, shaped electrode body for low temperature fuel cells comprising:
   (a) a porous envelope of sintered catalytically inactive metal enveloping a porous, non-sinterable catalyst core,
   (b) said envelope having side walls, a first end wall and a second end wall, said side and end walls together enclosing a recess in which said catalyst core is disposed,
   (c) said first end wall and said side walls having a smaller average pore diameter than said second end wall and of any of the catalyst in said catalyst core,
   (d) said catalyst core consisting of a multiplicity of at least three layers of catalyst, each layer lying in a plane substantially parallel to the end walls,
   (e) the first of said layers being disposed adjacent said first end wall and having an average pore diameter significantly larger than that of said end wall,
   (f) the second of said layers being disposed adjacent said first layer and having an average pore diameter significantly larger than that of said first layer,
   (g) the third of said layers being disposed adjacent said second layer and having an average pore diameter significantly larger than that of said second layer,
   (h) the last of said multiplicity of layers having one surface adjacent the last preceding layer and the other surface adjacent said second end wall and having a pore diameter significantly larger than that of any preceding layer, and smaller than that of said second end wall, and
   (i) the pore diameters of said first end wall and of said multiplicity of layers forming a gradation of sizes from small to large beginning with said first end wall, with the pore diameter of the second end wall greater than that of the first end wall and any layer of catalyst.

2. The electrode according to claim 1 wherein the pore diameters of the layers are as follows:
   (a) first layer from about 0.1 to about 2 microns,
   (b) second layer from about 2.5 to about 10 microns,
   (c) third layer from about 5 to about 20 microns,
   (d) the pore diameters of any succeeding layer similarly being larger in diameter than those of an immediately preceding layer but less than about 100 microns in diameter.

3. A fuel cell comprising, in combination, a fuel electrode immersed in an alkaline electrolyte and a gas diffusion electrode according to claim 1, said gas diffusion electrode being disposed in said cell with its first end wall adjacent said electrolyte and its second end wall adjacent gas in said cell.

4. The electrode of claim 1, in which the electrical contact of the catalyst material has been improved by the admixture of a metal in particulate form which is catalytically inactive but has a substantially higher electrical conductivity than the catalyst material.

References Cited

UNITED STATES PATENTS

| 2,615,932 | 10/1952 | Marko et al. | 136—120 |
| 3,068,311 | 12/1962 | Chambers et al. | 136—120 |
| 3,077,507 | 2/1963 | Kordesch et al. | 136—120 |
| 3,121,031 | 2/1964 | Gruneberg et al. | 136—86 |
| 3,201,282 | 8/1965 | Justi et al. | 136—120 |
| 3,212,936 | 10/1965 | McEvoy et al. | 136—120 |

ALLEN B. CURTIS, *Primary Examiner.*

WINSTON A. DOUGLAS, *Examiner.*

D. L. WALTON, *Assistant Examiner.*